United States Patent [19]
Durant et al.

[11] Patent Number: 5,778,672
[45] Date of Patent: Jul. 14, 1998

[54] BRAKE VALVE

[75] Inventors: Douglas Michael Durant, Waterloo, Iowa; Peter William Backes, Searcy, Ark.

[73] Assignees: Deere & Company, Moline, Ill.; Vickers, Inc., Searcy, Ark.

[21] Appl. No.: 733,229

[22] Filed: Oct. 17, 1996

[51] Int. Cl.$^6$ .................. B60T 13/00; F15B 7/00
[52] U.S. Cl. ................. 60/547.1; 60/581; 60/591
[58] Field of Search ................. 6/533, 547.1, 581, 6/591

[56] References Cited

U.S. PATENT DOCUMENTS

| | | |
|---|---|---|
| 4,738,109 | 4/1988 | Miller et al. |
| 5,233,835 | 8/1993 | Gawlick ............ 60/578 |
| 5,239,828 | 8/1993 | Gawlick ............ 60/581 |
| 5,394,701 | 3/1995 | Durant et al. |
| 5,400,595 | 3/1995 | Durant. |

Primary Examiner—Hoang Nguyen

[57] ABSTRACT

A two stage brake valve communicates fluid pressure to a brake mechanism. The brake valve has an inlet for receiving pressurized brake fluid from a pump, a reservoir port, a stepped bore and a stepped piston member comprising a larger diameter prefill piston and a smaller diameter high pressure piston. The stepped bore and the stepped piston form a high volume prefill chamber and a high pressure chamber. The high pressure piston has a metering groove which controls communication between the inlet and the brake mechanism. A bleed orifice is formed in the high pressure piston and communicates the high pressure chamber to an outer surface of the high pressure piston. The bleed orifice includes an annular bleed groove formed in an outer surface of the high pressure piston and a radial passage extending from the bleed groove to an interior of the high pressure piston. The bleed groove is positioned so that the bleed orifice is open to the reservoir port via the prefill chamber during initial piston movement, and closed upon movement of the high pressure piston a predetermined distance beyond the position wherein the metering groove is first communicated with the inlet.

3 Claims, 3 Drawing Sheets

BRAKE VALVE

BACKGROUND OF THE INVENTION

The invention relates to a dual stage brake control valve.

A dual stage hydraulic brake valve is used on production John Deere 6000, 7000, 8000 and 9000 tractors. Similar valve designs are disclosed in U.S. Pat. No. 4,738,109, issued 19 Apr. 1988 to Miller et al, and in U.S. Pat. No. 5,400,595, issued 28 Mar. 1995 to Durant. A brake valve with a prefill piston unloader valve is disclosed in U.S. Pat. No. 5,394,701, issued 7 Mar. 1995 to Durant et al. All these designs involve two stage hydraulic brake valves which provide the capability for power braking under normal conditions and manual braking when hydraulic power is not available at the brake valve pressure inlet.

In the power mode, these brake valves function similar to a pressure reducing valve with load sensing capability. These brake valves include a load sense bleed orifice which reduces valve hysteresis and improves stability. These brake valves also provide a load sense signal which allows the pump to maintain only the pressure which is demanded. The pump provides all of the oil volume required for braking.

In the manual mode, these brake valves must provide all of the oil needed to develop the desired braking pressure. This is done in two stages. In the first stage, the prefill piston provides a large volume of oil at low pressure in order to engage the brake components. Once this volume is satisfied, the brake valve transitions to the second stage wherein a smaller piston/spool generates the higher pressures required for braking. Both pressure metering and return flow metering are performed by a single annular groove in the high pressure piston/spool.

The load sense bleed orifice creates a leakage path which must be blocked during the manual braking function. As a result, these brake valves also include a load sense shut-off valve which isolates the load sense signal and orifice when the valve transitions to the manual mode. The load sense shut-off valve adds additional complexity to the valves. It is desired to have a valve with a simpler design, with fewer parts and which requires less machining to produce.

SUMMARY OF THE INVENTION

Accordingly, an object of this invention is to provide a brake valve which is simpler and which is easier and less costly to machine.

This and other objects are achieved by the present invention, wherein a two stage brake valve includes a stepped bore and a stepped piston member comprising a larger diameter prefill piston and a smaller diameter hollow high pressure piston. The stepped piston is movable away from a rest position to transfer fluid to a brake mechanism. The stepped bore and the stepped piston form a high volume prefill chamber and a high pressure chamber. The high pressure piston has a metering groove which is communicated with the brake mechanism, and which is communicated with the inlet when the high pressure piston has moved a certain distance to transfer fluid from the high pressure chamber to the brake mechanism. A bleed orifice is formed in the high pressure piston and communicates the high pressure chamber to an outer surface of the high pressure piston. The bleed orifice is positioned so that the bleed orifice is initially open, and remains open until the metering groove slightly overlaps with the inlet. Upon further movement of the stepped piston the bleed orifice is closed so that, during manual operation of the valve, brake pressure is not lost via the bleed orifice.

DETAILED DESCRIPTION

Figure 1:
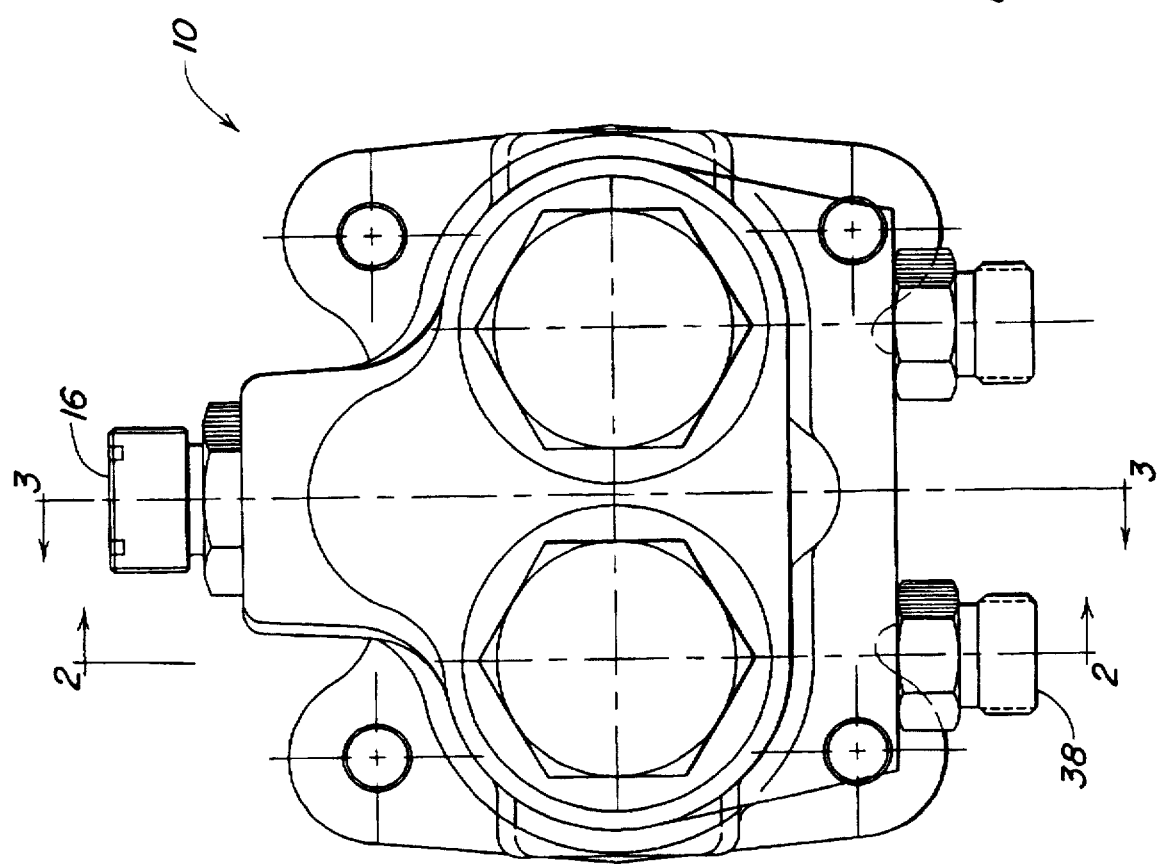
FIG. 1 is an end view of a two-stage brake valve according to the present invention.
Figure 2:
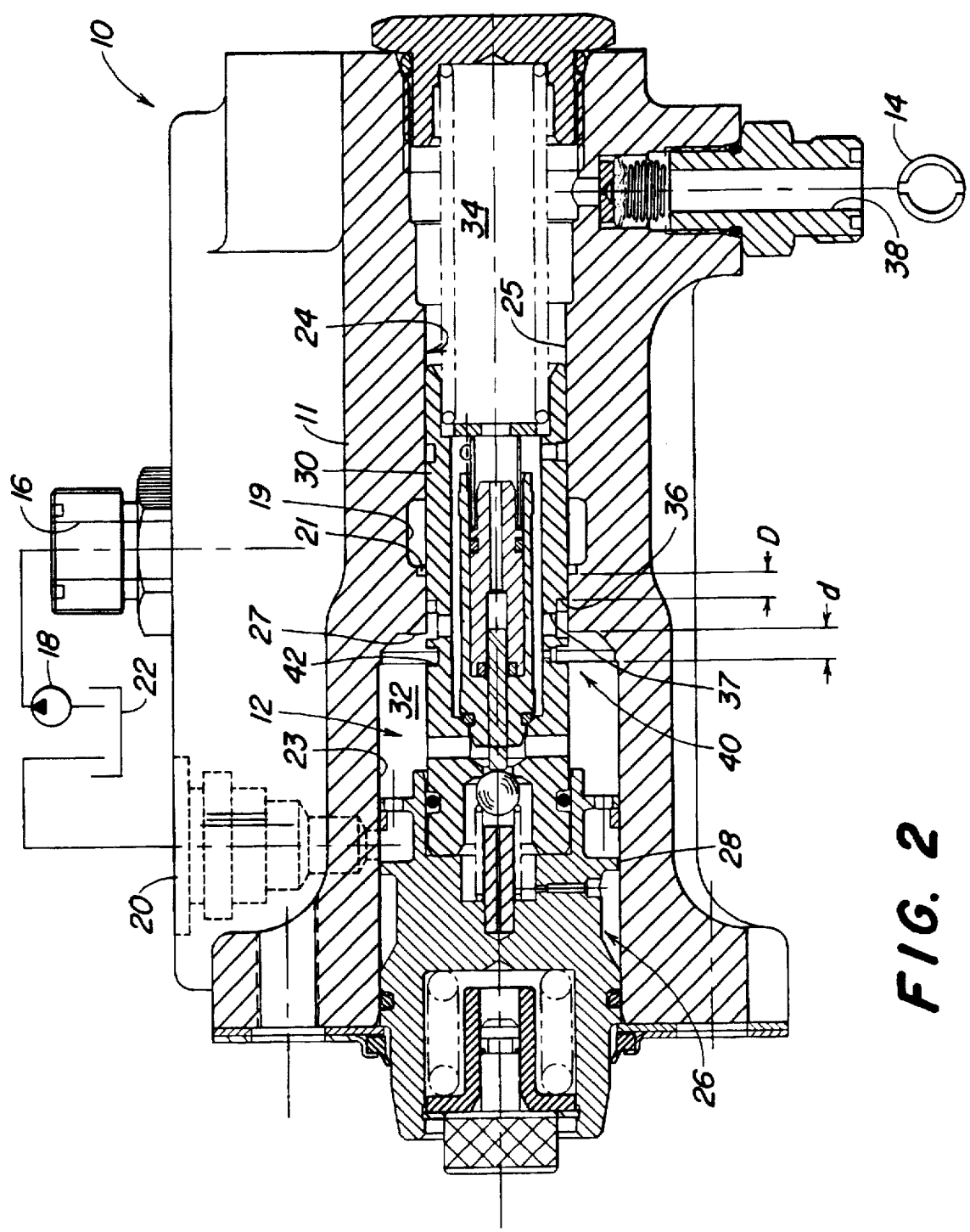
FIG. 2 is a cross-sectional view along lines 2—2 of FIG. 1.
Figure 3:
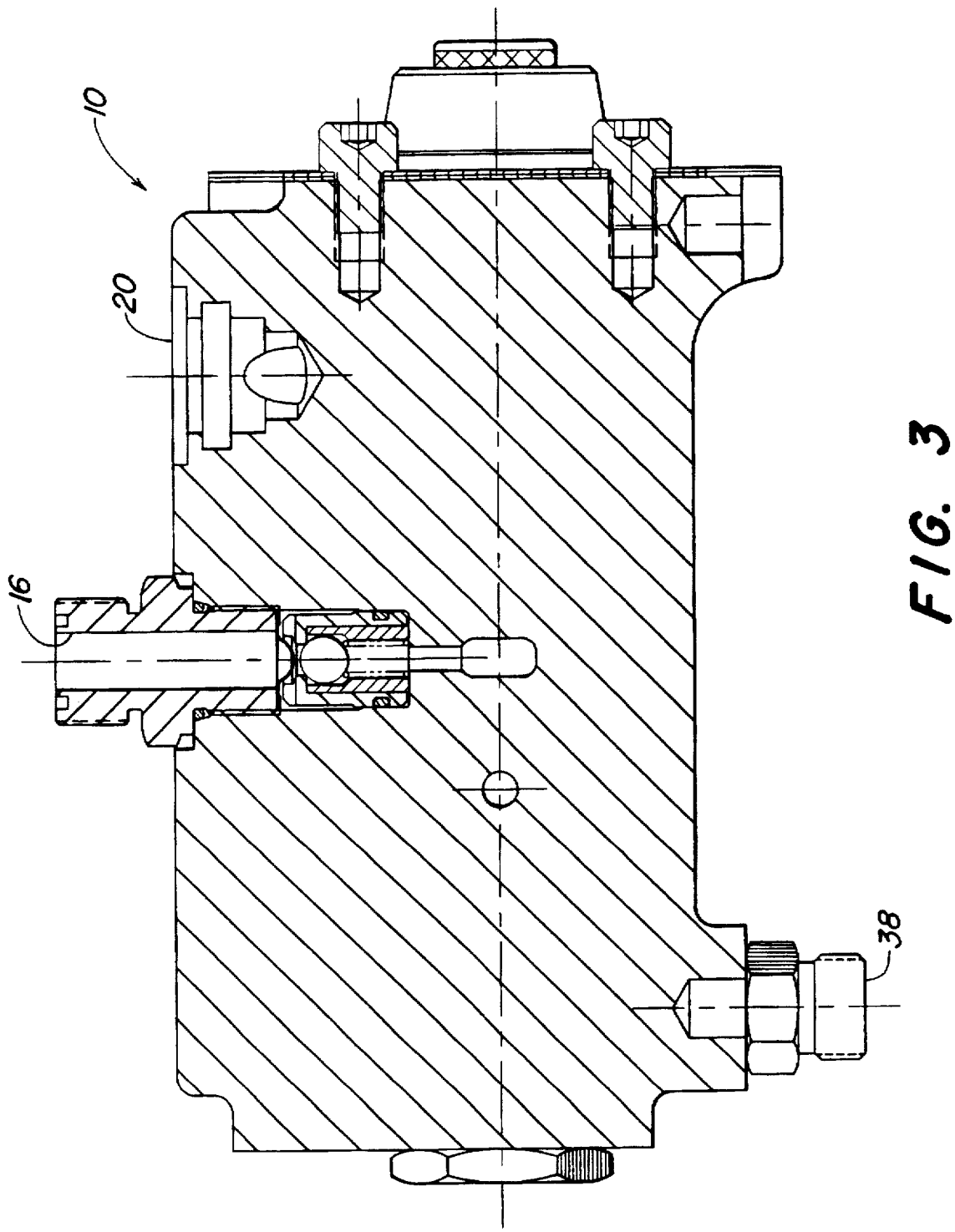
FIG. 3 is a cross-sectional view along lines 3—3 of FIG. 1.

Referring to FIGS. 1 and 2, there is shown one side of a dual two stage brake valve 10 a housing 11 which encloses a left two stage brake valve (not shown) and a right two stage brake valve 12 for communicating fluid pressure to a left brake mechanism (not shown) and right brake mechanism 14, respectively. Each brake valve has an inlet 16 for receiving pressurized brake fluid from a pump 18, an inlet groove 19 communicating with the inlet 16, a reservoir port 20 for communicating with a reservoir 22, a stepped bore 24 with large diameter section 23 and small diameter section 25 joined by shoulder 27. A smaller annular groove 21 is formed on the side of inlet groove 19 closest to prefill chamber 32.

A stepped piston member 26 includes a larger diameter prefill piston 28 and a smaller diameter hollow high pressure piston or sleeve 30. The stepped bore 24 and the stepped piston member 26 form a high volume prefill chamber 32 and a high pressure chamber 34. The high pressure piston 30 has a metering groove 36 and radial bores 37 communicated with the brake mechanism 14 via outlet 38 and chamber 34. The structure described so far is the same as that of the brake valve described in the aforementioned U.S. Pat. No. 5,400,595.

According to the present invention, a bleed orifice 40 is formed in the high pressure piston 30 adjacent to the metering groove 36 and located between metering groove 36 and the prefill piston 28. The bleed orifice 40 comprises an annular bleed groove 42 formed in an outer surface of the high pressure piston 30 and a narrow radial passage 41 extending from the bleed groove 42 to the interior of the high pressure piston 30.

When the piston 26 is in the rest position shown in FIG. 2, the bleed orifice 40 communicates the high pressure chamber 34 to the reservoir 22 via prefill chamber 32 and port 20, and the bleed orifice remains open to the reservoir port 20 during initial movement of the high pressure piston 30 from its rest position. The edges of groove 21 and metering groove 36 are separated by distance D. The shoulder 27 and the edge of bleed groove 42 farthest therefrom are separated by distance d. Distance D is slightly smaller than distance d. As a result, the bleed orifice 40 will be open during the first millimeter of overlap of the metering groove 36 with the inlet grooves 19 and 21. Upon further movement of piston to the right, the bleed groove 42 is closed by the wall of bore 25 as the metering groove 36 further opens to the inlet groove 19, so that, during manual operation of the valve brake pressure is not lost via the bleed orifice 40. As a result, the load sense shut-off valve, the load sense port and the associated machined passages may be eliminated from the design of present invention. Furthermore, the bleed orifice results in a valve wherein similar movements of the high pressure piston 30 in both directions produce similar pressure increases and decreases—a low hysteresis valve.

While the present invention has been described in conjunction with a specific embodiment, it is understood that many alternatives, modifications and variations will be apparent to those skilled in the art in light of the foregoing description. For example, the concept of this invention would also be functional in a case where the inlet pressure is provided from a pressure/flow compensated hydraulic pump system or a "low" pressure fixed displacement pump type system source. Accordingly, this invention is intended to embrace all such alternatives, modifications and variations which fall within the spirit and scope of the appended claims.

What is claimed is:

1. A two stage brake valve for communicating fluid pressure to a brake mechanism, the brake valve having an inlet for receiving pressurized brake fluid from a pump, a reservoir port, a stepped bore and a stepped piston movable therein, the stepped piston comprising a larger diameter prefill piston and a smaller diameter hollow high pressure piston, the stepped piston being movable away from a rest position to transfer fluid to the brake mechanism, the stepped bore and the stepped piston forming a high volume prefill chamber and a high pressure chamber, the high pressure piston having a metering groove communicated with the brake mechanism, the metering groove being communicated with the inlet when the high pressure piston has moved a certain distance to transfer fluid from the high pressure chamber to the brake mechanism, characterized by:

a bleed orifice formed in the high pressure piston, so that, during initial movement of the stepped piston from its rest position the bleed orifice communicates the high pressure chamber to the reservoir port while the metering groove is in communication with the inlet, the bleed orifice being closed upon movement of the high pressure piston a predetermined distance beyond said certain distance.

2. The brake valve of claim 1, wherein:

the bleed orifice comprises an annular bleed groove formed in an outer surface of the high pressure piston and a radial passage extending from the bleed groove to an interior of the high pressure piston and communicated with the high pressure chamber.

3. The brake valve of claim 2, wherein:

the bleed groove is positioned between the prefill piston and the metering groove.

\* \* \* \* \*